(12) United States Patent
Brooks et al.

(10) Patent No.: US 9,783,050 B2
(45) Date of Patent: Oct. 10, 2017

(54) POWER TRANSFER UNIT

(71) Applicant: GM GLOBAL TECHNOLOGY OPERATIONS LLC, Detroit, MI (US)

(72) Inventors: Craig R. Brooks, Harrison Township, MI (US); Gregory Sterba, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 14/527,038

(22) Filed: Oct. 29, 2014

(65) Prior Publication Data

US 2015/0343901 A1 Dec. 3, 2015

Related U.S. Application Data

(60) Provisional application No. 62/005,570, filed on May 30, 2014.

(51) Int. Cl.
| | |
|---|---|
| *B60K 17/346* | (2006.01) |
| *F16H 1/04* | (2006.01) |
| *B60K 17/344* | (2006.01) |
| *F16D 11/14* | (2006.01) |
| *F16D 28/00* | (2006.01) |
| *F16H 63/04* | (2006.01) |
| *F16H 61/32* | (2006.01) |
| *F16D 11/00* | (2006.01) |
| *F16D 23/12* | (2006.01) |

(52) U.S. Cl.
CPC ........ *B60K 17/3462* (2013.01); *B60K 17/344* (2013.01); *F16D 11/14* (2013.01); *F16D 28/00* (2013.01); *F16H 1/04* (2013.01); *F16D 2011/002* (2013.01); *F16D 2023/123* (2013.01); *F16H 61/32* (2013.01); *F16H 63/04* (2013.01); *Y10T 74/19614* (2015.01)

(58) Field of Classification Search
CPC ...... B60K 2023/085; B60K 2023/0858; B60K 2023/0875

See application file for complete search history.

(56) References Cited

U.S. PATENT DOCUMENTS

| | | | |
|---|---|---|---|
| 8,234,955 B2 * | 8/2012 | Palazzolo | B60K 23/08 180/247 |
| 8,469,854 B1 * | 6/2013 | Downs | B60K 23/08 475/221 |

(Continued)

*Primary Examiner* — Huan Le
*Assistant Examiner* — Lori Wu
(74) *Attorney, Agent, or Firm* — Cantor Colburn LLP

(57) ABSTRACT

A power transfer unit includes an input shaft extending along an input axis and an intermediate drive shaft extending at least partially through the input shaft along the input axis. The power transfer unit further includes a ring gear assembly having a ring gear and a ring gear shaft coupled to the ring gear. The ring gear shaft at least partially surrounds the input shaft and extends along the input axis. The power transfer unit also includes a collar coupled to the input shaft. The collar surrounds the input shaft and is movable relative to the ring gear shaft along the input axis between an engaged position and a disengaged position. When the collar is in the engaged position, the input shaft is coupled to the ring gear shaft. When the collar is in the disengaged position, the input shaft is decoupled from the ring gear shaft.

20 Claims, 3 Drawing Sheets

(56) References Cited

U.S. PATENT DOCUMENTS

| | | | | |
|---|---|---|---|---|
| 2011/0256976 A1* | 10/2011 | Burgbacher | ............ | B60K 17/35 475/198 |
| 2012/0204664 A1* | 8/2012 | Peura | .................. | B60K 17/344 74/405 |
| 2013/0055833 A1* | 3/2013 | Fukuda | .................. | B60K 17/35 74/15.86 |
| 2013/0333503 A1* | 12/2013 | Peura | ........................ | F16H 1/12 74/405 |
| 2014/0216189 A1* | 8/2014 | Anderson | ............ | B60K 17/344 74/335 |
| 2015/0219170 A1* | 8/2015 | Brooks | .................. | B60K 17/02 475/225 |
| 2016/0061274 A1* | 3/2016 | Engerer | .................. | F16D 11/14 192/35 |

\* cited by examiner

POWER TRANSFER UNIT

CROSS-REFERENCE TO RELATED APPLICATIONS

This application claims the benefit of U.S. Provisional Application No. 62/005,570, filed May 30, 2014, which is hereby incorporated by reference in its entirety.

TECHNICAL FIELD

The present disclosure relates to a power transfer unit.

BACKGROUND

Motor vehicles, such as cars, include a power transfer unit for transferring power from a vehicle transmission to the wheels. Specifically, the power transfer unit can selectively transfer power to both the front and rear wheels or only to the front wheels. Accordingly, the power transfer unit allows the vehicle to operate in a two-wheel drive mode or an all-wheel drive mode.

SUMMARY

It is useful to develop a power transfer unit that can be easily assembled and provide a part arrangement for its function. Accordingly, the presently disclosed power transfer unit has been developed. In an embodiment, the power transfer unit includes an input shaft extending along an input axis and an intermediate drive shaft extending at least partially through the input shaft along the input axis. The power transfer unit further includes a ring gear assembly having a ring gear and a ring gear shaft coupled to the ring gear such that torque may be transmitted between the ring gear and the ring gear shaft. The ring gear shaft at least partially surrounds the input shaft and extends along the input axis. The power transfer unit also includes a collar coupled to the input shaft such that torque may be transmitted between the input shaft and the collar. The collar at least partially surrounds the input shaft and is movable relative to the ring gear shaft along the input axis between an engaged position and a disengaged position. When the collar is in the engaged position, the input shaft is coupled to the ring gear shaft such that torque may be transmitted between the input shaft and the ring gear shaft. When the collar is in the disengaged position, the input shaft is decoupled from the ring gear shaft, thereby preventing torque from being transmitted between the ring gear shaft and the input shaft through the collar. The present disclosure also relates to a vehicle, such as a car, including the power transfer unit described above.

The above features and advantages and other features and advantages of the present teachings are readily apparent from the following detailed description of the best modes for carrying out the teachings when taken in connection with the accompanying drawings.

DETAILED DESCRIPTION

Figure 1:
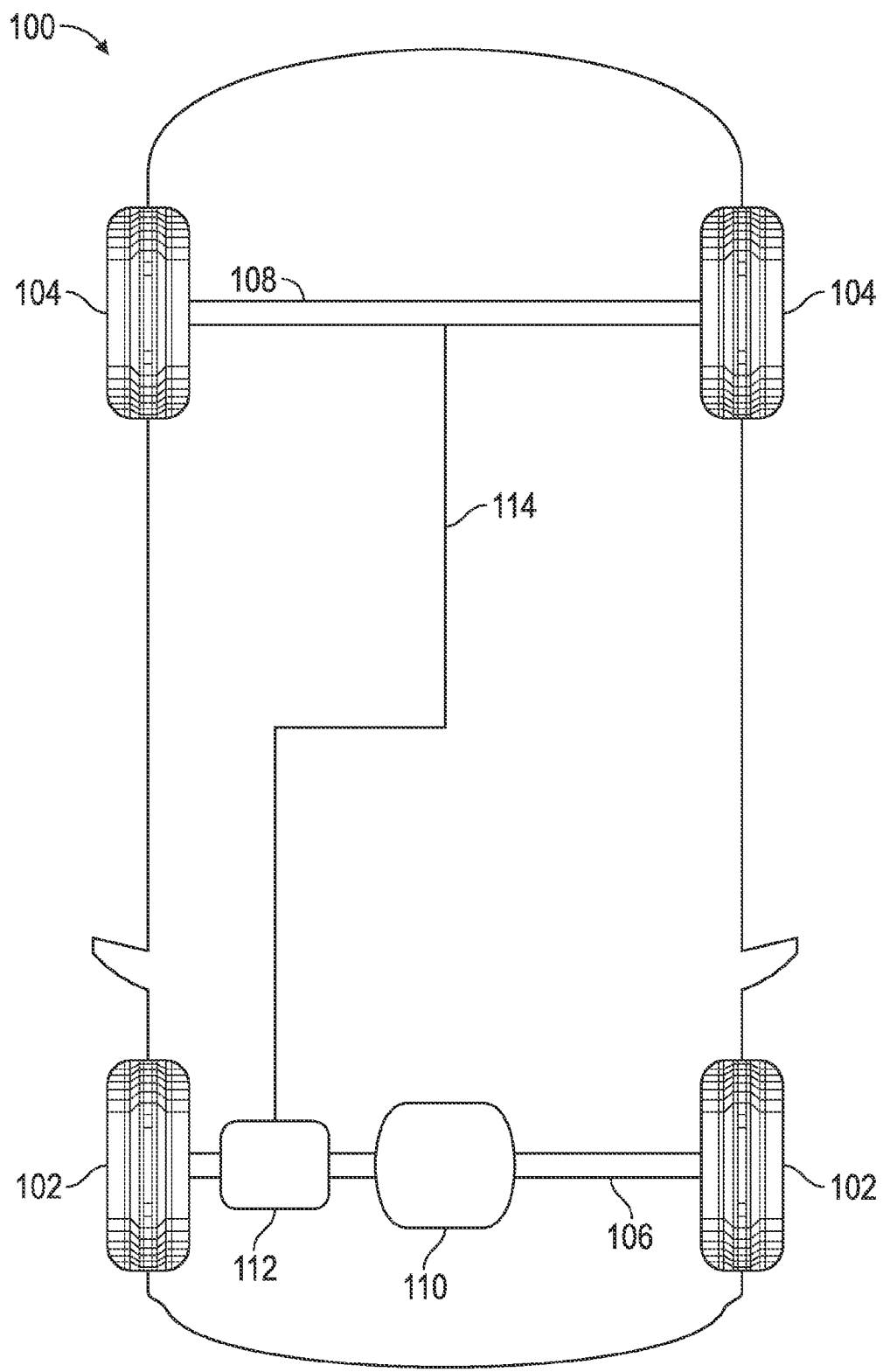
FIG. 1 is a schematic diagram of a vehicle including a front axle, front wheels, a rear axle, rear wheels, and a propeller shaft.

Referring to the drawings, wherein like reference numbers refer to like components throughout the several views, FIG. 1 schematically illustrates a vehicle 100 including a front wheels 102 and rear wheels 104. As non-limiting examples, the vehicle 100 may be a car or a truck. The vehicle 100 additionally includes a front axle 106 coupled to the front wheels 102 and a rear axle 108 coupled to the rear wheels 104. A differential 110 is coupled to the front axle 106 and allows the outer drive wheel (i.e., one of the front wheels 102) to rotate faster than the inner drive wheel (i.e., the other front wheel 102) during a turn. As a non-limiting example, the differential 110 includes a planetary gear set. The vehicle 100 includes a power transfer unit 112 operatively coupled to the differential 110. Accordingly, torque can be transmitted between the differential 110 and the power transfer unit 112. The power transfer unit 112 can receive torque from the differential 110 and can selectively transmit the torque to both the front wheels 102 and the rear wheels 104 or only to the front wheels 102, thereby allowing the vehicle 100 to operate in a two-wheel drive mode or an all-wheel drive mode. In the two-wheel drive mode, power is transferred from an engine (not shown) to the front wheels 102. In the all-wheel drive mode, power is transferred from the engine (not shown) to the front wheels 102 and the rear wheels 104. The vehicle 100 further includes a propeller shaft 114 (also known as a propshaft) operatively coupled to the rear axle 108. Thus, torque can be transmitted between the propeller shaft 114 and the rear axle 108. The propeller shaft 114 is also operatively coupled to the power transfer unit 112. Accordingly, torque can be transmitted between the propeller shaft 114 and the power transfer unit 112.

Figure 2:
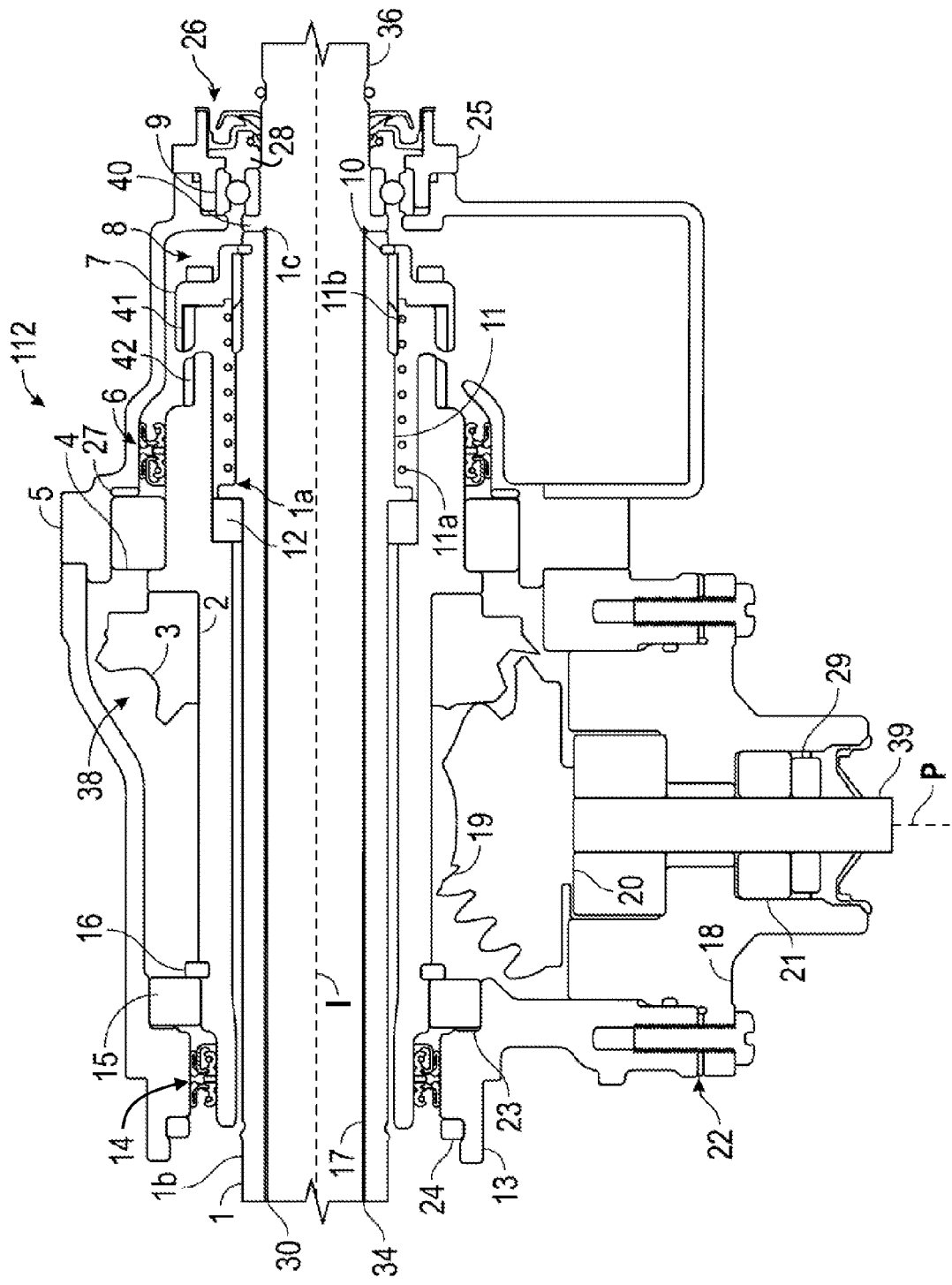
FIG. 2 is a schematic, cross-sectional side view of a power transfer unit of the vehicle shown in FIG. 1.

With reference to FIG. 2, the power transfer unit 112 includes an input shaft 1 operatively coupled to the differential 110 (FIG. 1). As such, torque can be transmitted between the differential 110 and the input shaft 1. The input shaft 1 extends along an input axis I and defines a first input shaft end 30 and a second input shaft end 1c opposite the first input shaft end 30. The first input shaft end 30 is directly coupled to the differential 110 (FIG. 1). Consequently, the input shaft 1 is supported by the differential 110 (FIG. 1) at the first input shaft end 30. An input shaft roller bearing 12 also supports the input shaft 1 and is closer to the second input shaft end 1c than to the first input shaft end 30. The input shaft 1 further includes an input shaft shoulder 1a that restricts axial movement of the input shaft 1 along the input axis I. Moreover, the input shaft 1 includes an input shaft spline 1b that attaches to the differential 110. In operation, the input shaft 1 rotates about the input axis I.

The power transfer unit 112 further includes an intermediate drive shaft 17 extending at least partially through the input shaft 1 along the input axis I. The intermediate drive shaft 17 defines a first drive shaft end 34 and a second drive shaft end 36 end opposite the first drive shaft end 34. The intermediate drive shaft 17 is operatively coupled to the differential 110 at the first drive shaft end 34. As such, torque can be transmitted between the differential 110 and the intermediate drive shaft 17. The first drive shaft end 34 is directly coupled to a side gear (not shown) of the differential 110. The intermediate drive shaft 17 is operatively coupled to at least one of the front wheels 102 (FIG. 1). Specifically, the second drive shaft end 36 is directly coupled to a half shaft (not shown) that is connected to one of the front wheels 102. Accordingly, torque can be transmitted between the intermediate drive shaft 17 and at least one of the front wheels 102. In operation, the intermediate drive shaft 17 rotates about the input axis I. The intermediate drive shaft 17 includes a radially extending stop 40 contacting the second input shaft end 1c in order to restrict axial movement of the input shaft 1.

Aside from the intermediate drive shaft 17, the power transfer unit 112 includes a ring gear assembly 38 selectively coupled to the input shaft 1 as described below in detail. The ring gear assembly 38 includes a ring gear shaft 2 and ring gear 3 operatively coupled to the ring gear shaft 2. Thus, torque can be transmitted between the ring gear 3 and the ring gear shaft 2. In the depicted embodiment, the ring gear shaft 2 is continuously connected to the ring gear 3, and the ring gear 3 is a spiral bevel gear. In operation, the ring gear shaft 2 and the ring gear 3 rotate about the input axis I. The ring gear shaft 2 at least partially surrounds the input shaft 1 and extends along the input axis I. Thus, the input shaft 1 and the intermediate drive shaft 17 extend through the ring gear shaft 2. The input shaft roller bearing 12 is disposed between the ring gear shaft 2 and the input shaft 1. The ring gear shaft 2 is supported by a first ring gear roller bearing 4. The first ring gear roller bearing 4 may be a tapered roller bearing and is disposed between the ring gear shaft 2 and cover housing 5. A ring gear selective shim 27 can be disposed between the first ring gear roller bearing 4 and the ring gear shaft 2 and can be used to preload the first ring gear roller bearing 4 and the second ring gear roller bearing 15. The cover housing 5 at least partially surrounds the ring gear shaft 2, the ring gear 3, the input shaft 1, and the intermediate drive shaft 17. A drive shaft ball bearing 9 is disposed between the cover housing 5 and the intermediate drive shaft 17. In particular, the drive shaft ball bearing 9 supports the intermediate drive shaft 17 and is closer to the second drive shaft end 36 than to the first drive shaft end 34. During assembly, a ring gear selective shim 23 can be used to adjust the position of the ring gear 3 relative to the cover housing 5. A retention snap ring 25 is disposed between the drive shaft ball bearing 9 and the cover housing 5 and can support the drive shaft ball bearing 9. The retention snap ring 25 also supports a drive shaft seal 26. A retention shaft snap ring 28 can be disposed between the drive shaft ball bearing 9 and the drive shaft seal 26 in order to restrain axial movement of the drive shaft ball bearing 9.

A first dual direction lip seal 6 is disposed between the cover housing 5 and the ring gear shaft 2. A second dual direction lip seal 14 is disposed between the ring gear shaft 2 and a main housing 13. The first and second dual direction lip seals 6, 14 have an internal cavity between the sealing lips that mates up with a weep hole (not shown) in the respective housing (i.e., cover housing 5 or the main housing 13) that allows fluid to flow should either the first or second dual direction lip seal 6, 14 become ineffective to prevent cross contamination of the fluids (e.g. oil). The main housing 13 is coupled to the cover housing 5 and at least partially covers the input shaft 1 and the intermediate drive shaft 17. The second ring gear roller bearing 15 is disposed between the ring gear shaft 2 and the main housing 13. Accordingly, the second ring gear roller bearing 15 supports the ring gear shaft 2. A ring gear snap ring 16 is coupled to the ring gear shaft 2 and abuts the second ring gear roller bearing 15, thereby restricting axial movement of the second ring gear roller bearing 15. The second ring gear roller bearing 15 may be a tapered roller bearing. An input face seal 24 may be coupled to the main housing 13 and helps prevent fluid flow into the power transfer unit 112.

The power transfer unit 112 additionally includes a pinion gear 19 meshing with the ring gear 3. Thus, torque can be transmitted between the pinion gear 19 and the ring gear 3. The pinion gear 19 and the ring gear 3 collectively define a hypoid gear set. Thus, the pinion gear 19 and the ring gear 3 may be spiral bevel gears. The main housing 13 at least partially covers the pinion gear 19 and is coupled to a pinion cartridge housing 18. During assembly, a pinion selective shim 22 can be used to adjust the position of the pinion gear 19. In operation, the pinion gear 19 can rotate about a pinion axis P. The pinion axis P may be substantially perpendicular to the input axis I in order to minimize the space occupied by the power transfer unit 112.

A pinion shaft 39 is operatively coupled to the pinion gear 19 and extends along the pinion axis P. Accordingly, torque can be transmitted between the pinion gear 19 and the pinion shaft 39. In operation, the pinion shaft 39 can rotate about the pinion axis P simultaneously with the pinion gear 19. The pinion shaft 39 is operatively coupled to the propeller shaft 114. Therefore, torque can be transmitted between the pinion shaft 39 and the propeller shaft 114 (FIG. 1). As discussed above, the propeller shaft 114 is coupled to the rear axle 108. Thus, torque can be transmitted from the pinion shaft 39 to the rear axle 108 through the propeller shaft 114.

A first pinion roller bearing 20 is disposed between the pinion shaft 39 and the pinion cartridge housing 18. A second pinion roller bearing 21 is also disposed between the pinion shaft 39 and the pinion cartridge housing 18. The first and second pinion roller bearings 20, 21 may be tapered roller bearings and support the pinion shaft 39. A pinion bearing jam nut 29 is disposed between the pinion cartridge housing 18 and the pinion shaft 39 and can be used to adjust the position of the pinion shaft 39 during assembly.

Figure 3:
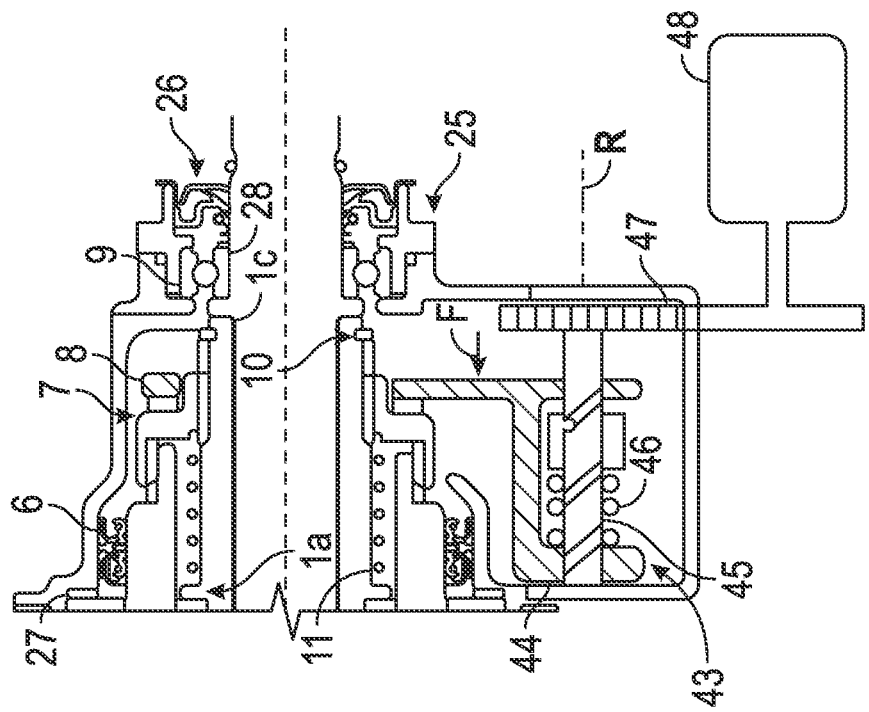
FIG. 3 is a schematic, cross-sectional side view of a portion of the power transfer unit of FIG. 2, showing an actuator in a deactivated position.
Figure 4:
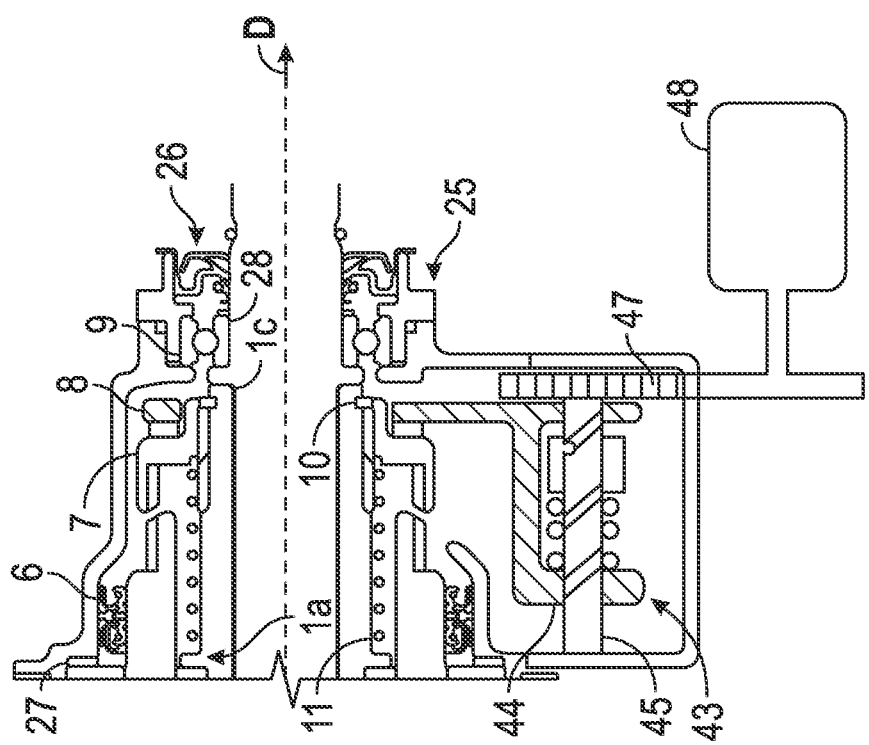
FIG. 4 is a schematic, cross-sectional side view of the portion of the power transfer unit depicted in FIG. 3, showing the actuator in an activated position.

The power transfer unit 112 further includes a collar 7 disposed around the input shaft 1. In other words, the collar 7 at least partially surrounds the input shaft 1. The collar 7 may be referred to as the shift collar and is operatively coupled to the input shaft 1. Accordingly, torque can be transmitted between the input shaft 1 and the collar 7. In other words, the collar 7 can rotate simultaneously with the input shaft 1. A collar retention snap ring 10 serves as a mechanical stop in order to restraint the axial movement of the collar 7 relative to the input shaft 1. Although the collar 7 is rotationally fixed to the input shaft 1, the collar 7 can move axially relative to the input shaft 1. Specifically, the collar 7 is movable relative to the input shaft 1 along the input axis I between a disengaged position (FIG. 3) and an engaged position (FIG. 4) as described in detail below. A needle roller bearing 8 is coupled to the collar 7 and can bear a force F (FIG. 4) applied to the collar 7 in order to move the collar 7 to the engaged position (FIG. 4). A collar spring 11 is coupled between the input shaft 1 and the collar 7 and can therefore bias the collar 7 toward the disengaged position (FIG. 3). Specifically, a first collar spring end 11a of the collar spring 11 is directly coupled to the input shaft shoulder 1a and a second collar spring end 11b of the collar spring 11 is directly coupled to the collar 7. Consequently, the collar spring 11 biases the collar 7 in the direction indicated by arrow D (FIG. 3) away from the input shaft shoulder 1a. The direction indicated by arrow D (FIG. 3) is opposite to the direction of the force F (FIG. 4).

The collar 7 further includes collar splines 41. The collar splines 41 can be annularly arranged around the collar 7 and can be used to rotationally couple the collar 7 to the ring gear shaft 2 when the collar 7 is in the engaged position (FIG. 4). The ring gear shaft 2 includes ring gear splines 42 that mesh with the collar splines 41 when the collar 7 is in the engaged position (FIG. 4). When the collar splines 41 mesh with the ring gear splines 42, torque can be transmitted between the input shaft 1 and the ring gear shaft 2 through the collar 7.

With reference to FIG. 3, when the collar 7 is in the disengaged position, the input shaft 1 is decoupled from the ring gear shaft 2 and, therefore, torque cannot be transmitted between the input shaft 1 and the ring gear shaft 2. In other words, because the collar 7 is decoupled from the ring gear shaft 2, the torque transfer from the input shaft 1 cannot be transmitted to the ring gear shaft 2 through the collar 7. The vehicle 100 operates in the two-wheel drive mode when the collar 7 is in the disengaged position because torque is only being transferred from the input shaft 1 to the front wheels 102. The collar retention snap ring 10 serves as a mechanical stop and prevents further movement of the collar 7 in the direction indicated by arrow D. When the vehicle 100 operates in the two-wheel drive mode, the only drag of the power transfer unit 112 is due to the differential speed across the input shaft roller bearing 12. In other words, when the vehicle 100 operates in the two-wheel drive mode, drag is reduced to a minimum by allowing the input shaft 1 to center on the differential 110 at the first drive shaft end 34 and by only having a single small ball bearing (i.e., input shaft roller bearing 12) with relative motion. Because the drag is minimized in the power transfer unit 112, the fuel economy of the vehicle 100 is maximized.

With reference to FIG. 4, when the collar 7 is in the engaged position (FIG. 4), the input shaft 1 is coupled to the ring gear shaft 2 and, therefore, torque can be transmitted between the input shaft 1 and the ring gear shaft 2 through the collar 7. The vehicle 100 operates in the all-wheel drive mode when the collar 7 is in the engaged position (FIG. 4) because torque can be transmitted from the input shaft 1 to the front wheels 102 and the rear wheels 104. Specifically, when the collar 7 is in the engaged position (FIG. 3), torque can be transmitted from the input shaft 1 to the pinion shaft 39 through the ring gear 3 and the pinion gear 19. Because the pinion shaft 39 is coupled to the rear axle 108 via the propeller shaft 114, torque can be transmitted from the pinion shaft 39 to the rear wheels 104 when the collar 7 is in the engaged position. Accordingly, the ring gear 3 is selectively coupled to the rear axle 108 because torque can be transmitted between the ring gear 3 and the rear axle 108 only when the collar 7 is in the engaged position. In other words, the rear wheels 104 are selectively coupled to the ring gear 3. The front wheels 102, on the other hand, are continuously coupled to the input shaft 1 because torque can be transmitted between the input shaft 1 and the front wheels 102 regardless of whether the collar 7 is in the engaged position (FIG. 4) or the disengaged position (FIG. 3). In other words, the input shaft 1 is coupled to the front wheels 102 regardless of the location of the collar 7 relative to the ring gear shaft 2.

With reference to FIGS. 3 and 4, the power transfer unit 112 includes an actuator 43 in order to move the collar 7 from the disengaged position (FIG. 3) to the engaged position (FIG. 4). The actuator 43 is movable relative to the input shaft 1 along the input axis I. As such, the actuator 43 can exert the force F on the collar 7 to move the collar 7 from the disengaged position (FIG. 3) to the engaged position (FIG. 4). In the depicted embodiment, the actuator 43 includes a fork assembly 44 contacting needle roller bearing 8, which is coupled to the collar 7. The fork assembly 44 is configured to apply the force F to the collar 7 in order to move the collar 7 toward the engaged position (FIG. 4) against the influence of the collar spring 11. Moreover, the actuator 43 includes a threaded shaft 45 threadedly coupled to the fork assembly 44 such that rotation of the threaded shaft 45 about a rotation axis R causes the fork assembly 44 to move linearly along the rotation axis R in order to exert the force F on the collar 7. The actuator 43 includes an actuator spring 46 coupled to the fork assembly 44 in order to bias the fork assembly 44 in the same direction as the force F. In addition to the actuator spring 46, the actuator 43 includes a spur gear 47 capable of being driven by an electric motor 48 or any other mechanism capable of rotating the spur gear 47. When driven by the electric motor 48, the spur gear 47 can rotate about the rotation axis R and causes the threaded shaft 45 to rotate about the rotation axis R. As discussed above, rotating the threaded shaft 45 in one rotational direction causes the fork assembly 44 to move axially (in the direction of the force F), thereby urging the collar 7 to move toward the engaged position (FIG. 4). Rotating the threaded shaft in an opposite rotational direction causes the fork assembly 44 to move axially in the direction indicated by arrow D, thereby causing the collar 7 to move toward the disengaged position (FIG. 3). The collar spring 11 can also urge the collar 7 to move toward the disengaged position (FIG. 3). It is contemplated that the power transfer unit 112 may include another type of actuator capable of moving the collar 7 from the disengaged position (FIG. 3) to the engaged position (FIG. 4). As non-limiting examples, a hydraulic actuator or another kind of electromechanical actuator can be used to move the collar 7. The friction losses of the fork assembly 44 are eliminated by retracting the fork assembly 44 from the needle roller bearing 8. To do so, the fork assembly 44 can continue to move in the direction indicated by arrow D even when the collar 7 has reached its disengaged position (FIG. 4) until the fork assembly 44 is no longer in contact with the needle roller bearing 8.

The power transfer unit 112 can be assembled by retaining the main housing 13 facing upwardly. The main housing 13 is then sub-assembled with the second ring gear roller bearing 15, which can be located using the ring gear selective shim 23. The ring gear selective shim 23 can be used to adjust the position of the ring gear 3 in the sub-assembly. Then, the ring gear assembly 38 (which includes the ring gear shaft 2, the ring gear 3, the ring gear snap ring 16, and the input shaft roller bearing 12) is coupled to the rest of the sub-assembly and, due to gravity, all the components of the ring gear assembly 38 are retained in place.

The first dual direction lip seal 6 has an inner diameter of sufficient size to allow it to be installed with the cover housing 5 over the collar 7 and is pressed into the cover housing 5. The ring gear selective shim 27 is selected to provide the required amount of preload to the ring gear shaft 2 and is held in place by pressing the outer race of first ring gear roller bearing 4 into the cover housing 5. The inner race of first ring gear roller bearing 4 can be placed over the ring gear shaft 2 before assembling the input shaft 1. The input shaft 1 can be sub-assembled by loading the collar spring 11 and the collar 7. Then, the input shaft 1 is retained with the collar retention snap ring 10 after compressing the collar spring 11. The input shaft 1 can then be loaded into the ring gear shaft 2 and held by in place gravity. The components of the power transfer unit 112 to the right of the first dual direction lip seal 6 are lubricated via transmission fluid that seeps between the input shaft 1, the ring gear shaft 2, and the intermediate drive shaft 17. This transmission fluid lubricates the drive shaft ball bearing 9, the drive shaft seal 26, the needle roller bearing 8, the input shaft roller bearing 12, and the ring gear splines 42. Lubrication of the first dual direction lip seal 6 and the second dual direction lip seal 14 is guaranteed by transmission fluid splash from the ring gear 3 when the vehicle 100 operates in the all-wheel drive mode. When the vehicle 100 operates in the two-wheel drive mode, transmission fluid splash does not occur. The first dual direction lip seal 6 and the second dual direction lip seal 14 may always be submerged in transmission fluid.

The intermediate drive shaft 17 can be loaded into the input shaft 1 and held in place by gravity. The retention snap ring 25 is sub-assembled with the drive shaft ball bearing 9 and the drive shaft seal 26. When the retention snap ring 25 is placed over the intermediate drive shaft 17 and retained by threaded fasteners (not shown) to the cover housing 5, the axial position of all the intermediate drive shaft 17, the input shaft 1, and the ring gear shaft 2 are retained end-to-end via the a path defined along the main housing 13, ring gear selective shim 23, the second ring gear roller bearing 15, the ring gear snap ring 16, the ring gear shaft 2, input shaft roller bearing 12, the input shaft shoulder 1a, the second input shaft end 1c, the drive shaft ball bearing 9, and the retention snap ring 25. Thus, the power transfer unit 112 can be easily assembled without the use of complicated fixtures, allowing gravity to hold the components of the power transfer unit 112 in place during the assembly process.

Alternatively, the intermediate drive shaft 17 can also be retained axially by the retention shaft snap ring 28. The retention shaft snap ring 28 is installed after the installation of the cover housing 5 and prior to the installation of the drive shaft seal 26. This arrangement prevents the axial loads created by the half-shaft (not shown) from impinging on the other shafts (i.e., the input shaft 1 and the ring gear shaft 2).

The pinion cartridge housing 18 is sub-assembled with the pinion gear 19, the pinion shaft 39, and the first pinion roller bearing 20, and the second pinion roller bearing 21. The preload of the first pinion roller bearing 20 and the second pinion roller bearing 21 is set using the pinion bearing jam nut 29 on the pinion shaft 39. The pinion cartridge housing 18 is assembled into the final assembly by setting the pinion gear 19 to mesh with the ring gear 3 using the pinion selective shim 22.

While the best modes for carrying out the teachings have been described in detail, those familiar with the art to which this disclosure relates will recognize various alternative designs and embodiments for practicing the teachings within the scope of the appended claims.

The invention claimed is:

1. A power transfer unit, comprising:
an input shaft extending along an input axis;
an intermediate drive shaft extending at least partially through the input shaft along the input axis;
a ring gear assembly including a ring gear and a ring gear shaft coupled to the ring gear such that torque may be transmitted between the ring gear and the ring gear shaft, wherein the ring gear shaft at least partially surrounds the input shaft and extends along the input axis, the ring gear shaft having annularly arranged ring gear splines;
a collar coupled to the input shaft such that torque may be transmitted between the input shaft and the collar, wherein the collar at least partially surrounds the input shaft and is movable relative to the ring gear shaft along the input axis between an engaged position and a disengaged position, the collar having annularly arranged collar splines, wherein the collar splines mesh with the ring gear splines when in the engaged position;
a fork assembly coupled to the collar, wherein the fork assembly is configured to apply a force to the collar in order to move the collar toward the engaged position;
a collar spring coupled between the input shaft and the collar such that the collar is biased toward the disengaged position;
wherein the input shaft is coupled to the ring gear shaft such that torque may be transmitted between the input shaft and the ring gear shaft when the collar is in the engaged position; and
wherein the input shaft is decoupled from the ring gear shaft when the collar is in the disengaged position, thereby preventing torque from being transmitted between the ring gear shaft and the input shaft through the collar.

2. The power transfer unit of claim 1, further comprising a pinion gear meshing with the ring gear.

3. The power transfer unit of claim 2, further comprising a pinion shaft operatively coupled to the pinion gear such that torque may be transmitted between the pinion gear and the pinion shaft.

4. The power transfer unit of claim 3, wherein the pinion shaft extends along a pinion axis, and the pinion axis is substantially perpendicular to the input axis.

5. The power transfer unit of claim 4, further comprising a main housing at least partially covering the input shaft, the intermediate drive shaft, and the pinion gear.

6. A power transfer unit comprising:
an input shaft extending along an input axis;
an intermediate drive shaft extending at least partially through the input shaft along the input axis;
a ring gear assembly including a ring gear and a ring gear shaft coupled to the ring gear such that torque may be transmitted between the ring gear and the ring gear shaft, wherein the ring gear shaft at least partially surrounds the input shaft and extends along the input axis;
a collar coupled to the input shaft such that torque may be transmitted between the input shaft and the collar, wherein the collar at least partially surrounds the input shaft and is movable relative to the ring gear shaft along the input axis between an engaged position and a disengaged position;
a fork assembly coupled to the collar, wherein the fork assembly is configured to apply a force to the collar in order to move the collar toward the engaged position;
a collar spring coupled between the input shaft and the collar such that the collar is biased toward the disengaged position;
wherein the input shaft is coupled to the ring gear shaft such that torque may be transmitted between the input shaft and the ring gear shaft when the collar is in the engaged position; and
wherein the input shaft is decoupled from the ring gear shaft when the collar is in the disengaged position, thereby preventing torque from being transmitted between the ring gear shaft and the input shaft through the collar.

7. The power transfer unit of claim 6, further comprising an actuator coupled to the collar and movable relative to the input shaft along the input axis such that the actuator is capable of exerting a force on the collar toward the engaged position.

8. The power transfer unit of claim 7, wherein the actuator includes the fork assembly and a threaded shaft threadedly coupled to the fork assembly such that rotation of the threaded shaft causes the fork assembly to move linearly in order to exert the force on the collar.

9. The power transfer unit of claim 8, wherein the actuator includes a spur gear operatively connected to the threaded shaft such that rotation of the spur gear causes the threaded shaft to rotate.

10. The power transfer unit of claim 6, wherein the collar includes collar splines, the ring gear shaft includes ring gear splines configured to mesh the collar splines, and the ring gear splines mesh with the collar splines when the collar is in the engaged position.

11. A vehicle, comprising:
a differential;
a power transfer unit coupled to the differential, wherein the power transfer unit includes:
an input shaft extending along an input axis;
an intermediate drive shaft extending at least partially through the input shaft along the input axis;
a ring gear assembly including a ring gear and a ring gear shaft coupled to the ring gear such that torque may be transmitted between the ring gear and the ring gear shaft, wherein the ring gear shaft at least partially surrounds the input shaft and extends along the input axis;
a collar coupled to the input shaft such that torque may be transmitted between the input shaft and the collar, wherein the collar at least partially surrounds the input shaft and is movable relative to the ring gear shaft along the input axis between an engaged position and a disengaged position;
a fork assembly coupled to the collar, wherein the fork assembly is configured to apply a force to the collar in order to move the collar toward the engaged position;
a collar spring coupled between the input shaft and the collar such that the collar is biased toward the disengaged position;
wherein the input shaft is coupled to the ring gear shaft such that torque may be transmitted between the input shaft and the ring gear shaft when the collar is in the engaged position; and
wherein the input shaft is decoupled from the ring gear shaft when the collar is in the disengaged position, thereby preventing torque from being transmitted between the ring gear shaft and the input shaft through the collar;
a front wheel coupled to the input shaft such that torque may be transmitted between the input shaft and the front wheel regardless of a location of the collar relative to the ring gear shaft; and
a rear wheel coupled to the ring gear such that torque may be transmitted between the input shaft and the rear wheel when the collar is in the engaged position.

12. The vehicle of claim 11, further comprising a pinion gear meshing with the ring gear.

13. The vehicle of claim 12, further comprising a pinion shaft operatively coupled to the pinion gear such that torque may be transmitted between the pinion gear and the pinion shaft.

14. The vehicle of claim 13, wherein the pinion shaft extends along a pinion axis, and the pinion axis is substantially perpendicular to the input axis.

15. The vehicle of claim 14, further comprising a main housing at least partially covering the input shaft, the intermediate drive shaft, and the pinion gear.

16. The vehicle of claim 11, further comprising a collar spring coupled between the input shaft and the collar such that the collar is biased toward the disengaged position.

17. The vehicle of claim 16, further comprising an actuator coupled to the collar and movable relative to the input shaft along the input axis such that the actuator is capable of exerting a force on the collar toward the engaged position.

18. The vehicle of claim 17, wherein the actuator includes the fork assembly and a threaded shaft operatively coupled to the fork assembly such that rotation of the threaded shaft causes the fork assembly to move linearly in order to exert the force on the collar.

19. The vehicle of claim 18, wherein the actuator includes a spur gear operatively coupled to the threaded shaft such that rotation of the spur gear causes the threaded shaft to rotate.

20. The vehicle of claim 11, wherein the collar includes collar splines, the ring gear shaft includes ring gear splines configured to mesh the collar splines, and the ring gear splines mesh with the collar splines when the collar is in the engaged position.

* * * * *